US006743272B2

(12) United States Patent
Marth

(10) Patent No.: US 6,743,272 B2
(45) Date of Patent: Jun. 1, 2004

(54) FILTER BAG

(75) Inventor: Andreas Marth, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/221,799

(22) PCT Filed: Feb. 20, 2001

(86) PCT No.: PCT/DE01/00716

§ 371 (c)(1),
(2), (4) Date: Sep. 17, 2002

(87) PCT Pub. No.: WO01/69624

PCT Pub. Date: Sep. 20, 2001

(65) Prior Publication Data

US 2003/0172631 A1 Sep. 18, 2003

(30) Foreign Application Priority Data

Mar. 17, 2000 (DE) ........................................ 100 14 678

(51) Int. Cl.[7] .......................... B01D 39/20; B01D 46/02

(52) U.S. Cl. ....................... 55/385.4; 55/385.6; 55/515; 55/527; 96/135; 96/153

(58) Field of Search ............................ 55/385.1, 385.4, 55/385.6, 385.7, 515, 519, 527, 528; 96/108, 134, 135, 153

(56) References Cited

U.S. PATENT DOCUMENTS

| | | | | | |
|---|---|---|---|---|---|
| 2,214,925 | A | * | 9/1940 | Gutrie | 96/134 |
| 2,425,250 | A | * | 8/1947 | Lamb | 250/239 |
| 2,578,324 | A | * | 12/1951 | Southwick, Jr. | 96/153 |
| 3,057,138 | A | * | 10/1962 | Huxster | 55/486 |
| 3,535,852 | A | * | 10/1970 | Hirs | 55/302 |
| 4,070,519 | A | * | 1/1978 | Lefkowitz et al. | 442/190 |
| 4,243,715 | A | * | 1/1981 | Gordon | 442/71 |
| 4,270,935 | A | * | 6/1981 | Reinauer | 55/379 |
| 4,830,643 | A | * | 5/1989 | Sassa et al. | 96/108 |
| 5,171,339 | A | * | 12/1992 | Forsten | 55/379 |
| 5,174,969 | A | * | 12/1992 | Fischer et al. | 422/180 |
| 5,229,200 | A | * | 7/1993 | Sassa et al. | 442/57 |
| 5,258,164 | A | * | 11/1993 | Bloom et al. | 422/174 |
| 5,460,637 | A | * | 10/1995 | Connolly et al. | 55/487 |
| 5,549,966 | A | * | 8/1996 | Sassa | 442/198 |
| 5,766,282 | A | * | 6/1998 | Bin | 55/361 |
| 5,902,363 | A | * | 5/1999 | Connolly et al. | 55/487 |
| 6,110,243 | A | * | 8/2000 | Wnenchak et al. | 55/379 |
| 6,261,335 | B1 | * | 7/2001 | Kern et al. | 55/527 |
| 6,352,579 | B1 | * | 3/2002 | Hirata et al. | 96/134 |
| 6,355,079 | B1 | * | 3/2002 | Sorvari et al. | 55/486 |
| 6,428,612 | B1 | * | 8/2002 | McPhilmy et al. | 96/132 |

FOREIGN PATENT DOCUMENTS

| | | |
|---|---|---|
| DE | 25 57 298 | 6/1977 |
| DE | 33 21 313 A1 | 8/1984 |

* cited by examiner

*Primary Examiner*—Robert H. Spitzer
(74) *Attorney, Agent, or Firm*—Morrison & Foerster LLP

(57) ABSTRACT

The invention relates to a filter bag for holding filtering material located inside a gas-installed housing of the electrical installation. The filter bag is produced from a fabric that is resistant to high temperatures, which eliminates the need for holding devices protecting the filter bag from hot switching gases to be provided inside the compressed gas housing.

2 Claims, 1 Drawing Sheet

FILTER BAG

CLAIM FOR PRIORITY

This application claims priority to International Application No. PCT/DE01/00716 which was published in the German language on Sep. 20, 2001.

TECHNICAL FIELD OF THE INVENTION

The invention relates to a filter bag for the reception of filter material, and in particular, to a filter bag for the reception of filter material which is within a casing of a compressed-gas-insulated electric switch unit generating a switch gas jet during a switch-off operation, binds decomposition products from the switch gas.

BACKGROUND OF THE INVENTION

A filter bag is known, for example, from laid-open publication DE 25 57 298 A1. A three-phase-encased compressed-gas-insulated power switch may be gathered from the laid-open publication. The compressed gas used is sulfur hexafluoride ($SF_6$). By means of an electric arc occurring during switching actions, the sulfur hexafluoride is decomposed. The decomposition products formed occur as gaseous and solid substances. When the concentration of the decomposition products rises, there is the risk that the insulating properties of the compressed gas are adversely influenced. In order to separate these decomposition products and, if appropriate, moisture bound in the sulfur hexafluoride, filters are provided within the casing. The active filter material is introduced in small filter bags into the interior of the casing. To receive the filter bags, reception devices are provided inside, which include, for example, a metallic perforated material, in order to achieve good gas permeability. Arranging the reception devices for the filter bags within the casing arises from the requirements of sufficient dielectric and thermal dimensioning. The reception devices, in addition to receiving the filter material bags, serve essentially for protecting the filter bags against hot switch-gas or plasma streams occurring during a switching operation. The deflector action of the perforated material is necessary in order to avoid combustion of the filter bags and consequently destruction of the filters. The design of the perforated material must in this case be such that a sufficient throughflow is possible in spite of the protection of the filters.

The arrangement of the filters always constitutes a compromise between a position with an optimum filter behavior and a favorable electric arrangement of the reception devices influencing the electric field.

SUMMARY OF THE INVENTION

The present invention discloses a filter such that a reduction of metallic reception devices is obtained within compressed-gas spaces of electrically encased installations.

In one embodiment of the invention, the filter bag includes a high-temperature-resistant fabric and is arranged in the switch gas jet. When the filter bags are produced from a high-temperature-resistant fabric, it is possible to dispense with metal sheets which protect the filter bags against the hot switch gases. With these metal sheets being dispensed with, they can no longer influence the dielectric field within the casing. The filter bags can then be arranged within the casing in a substantially more flexible way. Furthermore, an appreciable cost benefit is to be noted, since the complicated reception devices have a simpler configuration or other subassemblies can be designed in such a way that the reception devices are dispensed with completely.

Furthermore, there may be provision for the fabric to be a mixture of amorphous, inorganic and high-crystalline organic synthetic fibers.

A fabric of this kind has good gas permeability and consequently has an insignificant influence on the filter action of the active filter material. In particular, the continuous-duty temperature resistance of several 100° C. and the contact temperature resistance of more than 1000° C. constitute beneficial properties for use within a compressed-gas-insulated switch installation. Furthermore, the material is resistant to sparks, flames and smoldering. In addition to the excellent thermal properties, a fabric of this kind has optimum mechanical properties, in particular a high tearing strength in the longitudinal and transverse direction, thus ensuring good protection of the filter material against mechanical stress during introduction into the casing and against mechanical vibrations occurring during operation. Fabrics of this kind are known, for example, under the tradenames Systaceram or Kevlar.

BRIEF DESCRIPTION OF THE DRAWINGS

The invention is shown hereafter by means of a drawing and is described in more detail below. In the drawing.

DETAILED DESCRIPTION OF THE PREFERRED EMBODIMENTS

Figure 1:
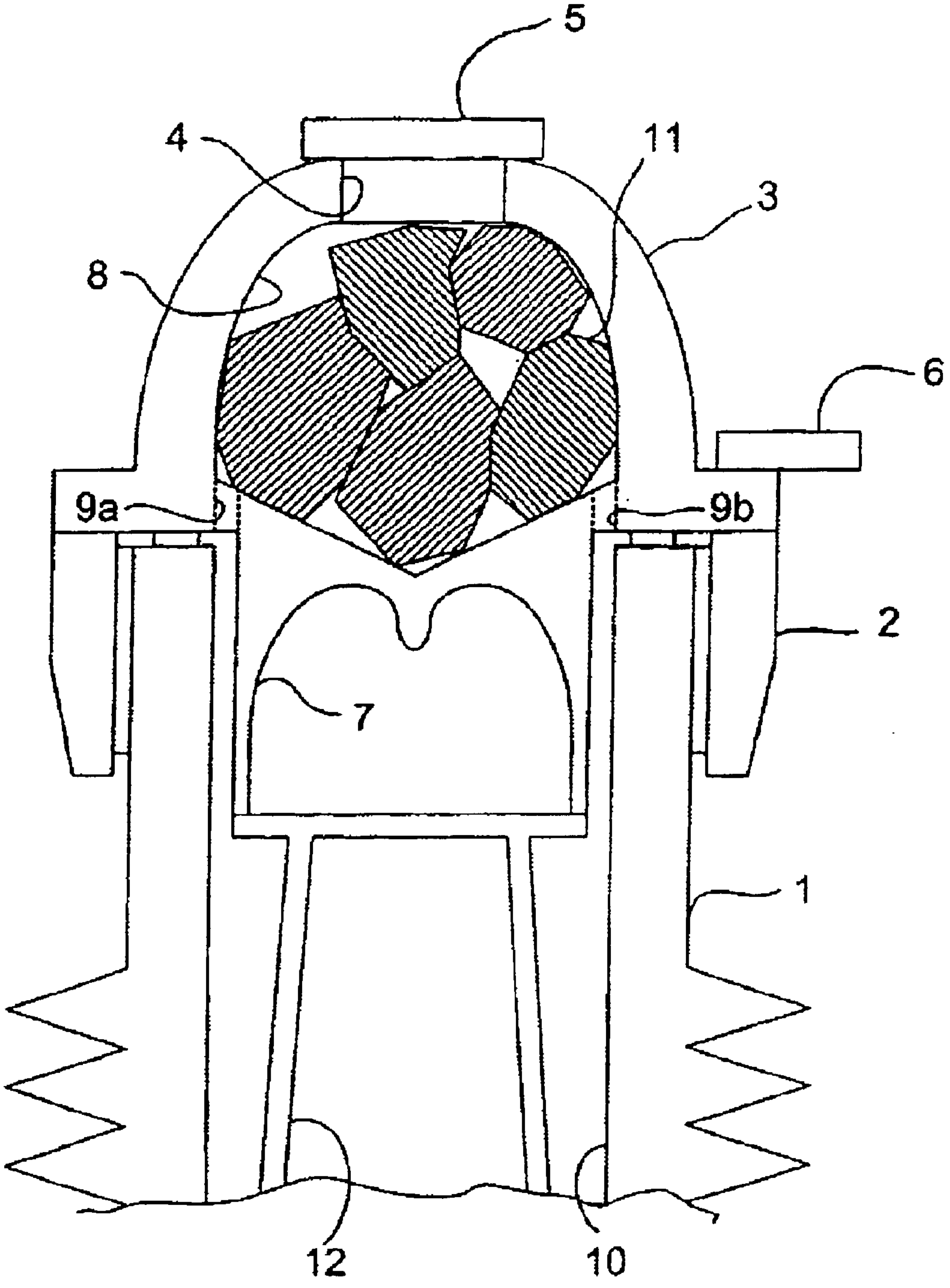
FIG. 1 shows a diagrammatic arrangement of the filter bags in a compressed-gas casing.

FIG. 1 illustrates diagrammatically a detail of an outdoor version of a high-voltage power switch. One end of a breaker unit is illustrated in section. The compressed-gas casing has a porcelain body 1 which is provided on its outer surface with a ribbing. The porcelain body 1 forms a main gas space 10 which receives a breaker unit 12. A mounting flange 2 is arranged at the end of the porcelain body 1. The mounting flange 2 serves for receiving a dome-shaped closing-off fitting 3. The dome-shaped closing-off fitting 3 has an orifice 4 which can be closed by means of a cover 5. Furthermore, a connection piece 6 for linking up to an electric installation is provided on the dome-shaped closing-off fitting 3. The dome-shaped closing-off fitting 3 has, on its side facing the porcelain body 1, an intermediate plate designed as a deflecting element 7 for switch gas streams. This deflecting element 7 serves for the mechanical mounting and electric contacting of one end of the breaker unit 12 which is arranged inside the compressed-gas casing. A cavity 8 has been formed by virtue of the dome-shaped design of the closing-off fitting 3 and the design of the deflecting element 7. The main gas space 10 is connected gas-permeably to the cavity 8 by means of a plurality of orifices 9*a*, 9*b*. The insulating and quenching gas used is sulfur hexafluoride. A plurality of filter bags 11 including filter material are arranged in the cavity 8. These filter bags 11 can be introduced through the orifice 4 of the dome-shaped closing-off element 3. The filter bags 11 comprise a high-temperature-resistant fabric. A high-temperature-resistant thread is used for stitching the bags.

The filter bags 11 are in this case in direct contact with the walls of the deflecting element 7 and of the dome-shaped closing-off fitting 3. As can be seen, additional heat-reflecting reception devices have been dispensed with.

The switch gas jet occurring during a switching-off operation flows out of an outlet orifice of the breaker unit 12 against the deflecting device 7 and is for a large part diverted. Parts of the switching gas stream flow directly through the orifices 9*a*, 9*b* into the cavity 8 and flow through the filter bags 11. The switch gas jet is reflected within the compressed-gas casing. The reflected switch gas jet increases the throughflow of the cavity 8 and of the filter bags 11 arranged in it.

The decomposition products included in the switch gas are bound by the filter material during the direct throughflow of the filter bags 11. The filter bags 11 being formed from a high-temperature-resistant fabric makes it possible for the hot switch gas jet to flow directly onto the filter bags 11. The filter action is improved compared with known arrangements.

What is claimed is:

1. A filter bag for the reception of filter material which, within a casing of a compressed-gas-insulated electric switch unit generating a switch gas jet during a switching-off operation, binds decomposition products from the switch gas such that the filter bag includes a temperature-resistant fabric and is arranged in the switch gas jet.

2. The filter bag as claimed in claim 1, wherein the fabric is a mixture of amorphous, inorganic and high-crystalline organic synthetic fibers.

* * * * *